United States Patent [19]
Reinders

[11] Patent Number: 5,891,287
[45] Date of Patent: Apr. 6, 1999

[54] METHOD FOR MANUFACTURING A FORM-RETAINING FOIL LAMINATE AND FOIL LAMINATE OBTAINED THEREWITH

[75] Inventor: Johannes Antonius Maria Reinders, Warnsveld, Netherlands

[73] Assignee: Sallmetall B.V., Raalte, Netherlands

[21] Appl. No.: 901,735

[22] Filed: Jul. 28, 1997

[30]  Foreign Application Priority Data

Jul. 29, 1996 [NL] Netherlands ............................ 1003697

[51] Int. Cl.$^6$ .................................................. B65H 23/00
[52] U.S. Cl. ......................... 156/164; 156/229; 156/289; 156/324
[58] Field of Search ..................................... 156/324, 555, 156/583.1, 160, 163, 164, 229, 289, 494, 582

[56]  References Cited

U.S. PATENT DOCUMENTS 4,921,556 5/1990 Hakiel et al. ............................ 156/164

FOREIGN PATENT DOCUMENTS

| | | |
|---|---|---|
| 0356837 | 3/1990 | European Pat. Off. . |
| 0369408 | 5/1990 | European Pat. Off. . |
| 0532168 | 3/1993 | European Pat. Off. . |
| 9302291 | 7/1995 | Netherlands . |
| 9421457 | 9/1994 | WIPO . |
| 9518056 | 7/1995 | WIPO . |

*Primary Examiner*—James Sells
*Attorney, Agent, or Firm*—Webb Ziesenheim Bruening Logsdon Orkin & Hanson, P.C.

[57]  ABSTRACT

A method for manufacturing a foil laminate with a defined curvature is provided. The method includes providing an encapsulating device having a transporting assembly for carrying a carrier foil through the device, a first supply device for supplying to the carrier foil a first skin laminate such that the glue layer forming part thereof is brought into contact with the first surface of the carrier foil, a second supply device for supplying to the other side of the carrier foil a second skin laminate such that the glue layer forming part thereof is brought into contact with the second surface of the carrier foil, and a pressing device having a pinch for exerting a pressure force on the stack passing through and including the first skin laminate, the carrier foil and the second skin laminate. The method further includes controlling the first and the second supply devices such that the first and the second skin laminates are each introduced into the pinch at a chosen tensile stress such that the skin laminates of the resulting laminate leaving the pinch which are mutually adhered via the carrier foil have respective tensions and in the free state the laminate has a curvature corresponding therewith.

20 Claims, No Drawings

METHOD FOR MANUFACTURING A FORM-RETAINING FOIL LAMINATE AND FOIL LAMINATE OBTAINED THEREWITH

BACKGROUND OF THE INVENTION

It is an object of the invention to provide a method which offers the possibility of manufacturing a foil laminate which has a defined curvature in the free state.

SUMMARY OF THE INVENTION

In respect of this objective the invention provides a method for manufacturing a foil laminate with a defined curvature, which method comprises the following steps of:

providing an encapsulating device comprising:
  transporting means for carrying a carrier foil through the device;
  first supply means for supplying to the carrier foil a first skin laminate such that the glue layer forming part thereof is brought into contact with the first surface of the carrier foil;
  second supply means for supplying to the other side of the carrier foil a second skin laminate such that the glue layer forming part thereof is brought into contact with the second surface of the carrier foil; and
  pressing means comprising a pinch for exerting a pressure force on the stack passing through and consisting of the first skin laminate, the carrier foil and the second skin laminate; and controlling the first and the second supply means such that the first and the second skin laminates are each introduced into said pinch at a chosen tensile stress such that the skin laminates of the resulting laminate leaving the pinch which are mutually adhered via the carrier foil have respective tensions and in the free state the laminate has a curvature corresponding therewith.

DESCRIPTION OF THE PREFERRED EMBODIMENTS

A specific embodiment of the method according to the invention aims at manufacturing a foil which is to a great extent form-retaining and has a total resulting curvature in free state with a value of zero.

In this respect the invention provides a method in which the said tensile stresses are equal and the resulting free laminate is flat.

A foil laminate manufactured with the method according to the invention has a curvature which is to a large degree constant.

A specific embodiment has the special feature that the first skin laminate has on its side remote from the glue layer a layer at least more or less repelling adhesion, for instance a layer of PTFE or a film of silicone material, and the second laminate has on its side remote from the glue layer a second glue layer, in particular a pressure-sensitive glue layer. A foil laminate obtained herewith has the advantage that when rolled up the second glue layer is unable or is at least to only a small extent able to adhere to the adhesion repelling layer consisting of PTFE or the film of silicone material. In order to prevent spontaneous unwinding of foil laminate form a supply roll it is however recommended to ensure that the relevant layers do mutually adhere at least to a slight extent.

Another embodiment has the special feature that the second laminate has on its side remote from the glue layer a second glue layer, in particular a thermally-activated glue layer.

For the same reasons as specified above in respect of a pressure-sensitive glue layer, the variant is recommended in the case of the latter described embodiment in which at least the outer surface of the second layer is to a slight extent pressure-sensitive. Also in this case the outer layers of a rolled-up foil laminate lying over each other adhere mutually to a slight extent, whereby spontaneous unwinding of the foil laminate from a supply roll is prevented.

The relevant glue layers are generally known. A pressure-sensitive glue layer can consist of acryl material. For very limited pressure-sensitive layers and layers of pressure-sensitive type adhering to a small extent a very thin layer of acryl material can be used. EVA for instance can be considered suitable as thermally activated adhesive. Attention is drawn to the fact that the said materials are mentioned only by way of example and not as limitation.

A particular embodiment has the special feature that the carrier foil consists of aluminium of a thickness of about 5–25 $\mu$m. Aluminium has the property of being non-transparent. In the case where a light-transmitting foil laminate is desired other materials are more suitable.

Use can also be made of a light-transmitting carrier foil and a non-transparent layer in one of the two skin laminates or in both skin laminates.

The stiffness and therewith the stability of the form of a resulting foil laminate can be improved by a method according to which the skin laminates each comprise a tensively strong layer.

This latter variant can be embodied such that the tensively strong layer consists of polyester/PET with a thickness of about 25–250 $\mu$m.

Finally, the invention also relates to a foil laminate obtained with any of the methods according to the invention. Such a foil laminate comprises at least a carrier foil and a skin laminate adhered thereto under bias on both sides and at least comprising a glue layer and a plastic layer of a suitable chosen material.

I claim:

1. A method for manufacturing a foil laminate having a defined curvature, the method comprising the steps of:
  a. providing an encapsulating device comprising:
    transporting means for carrying a carrier foil through the device, the carrier foil having a first surface and a second surface;
    a first supply means for supplying a first skin laminate to the first surface of the carrier foil, the first skin laminate having a glue layer, the first supply means supplying the first skin laminate such that the glue layer on the first skin laminate contacts the first surface of the carrier foil;
    a second supply means for supplying a second skin laminate to the second surface of the carrier foil, the second skin laminate having a glue layer, the second supply means supplying the second skin laminate such that the glue layer on the second skin laminate contacts the second surface of the carrier foil; and
    pressing means having a pinch for exerting a pressure force on a stack passing through the pinch, the stack including the carrier foil positioned between the first skin laminate and the second skin laminate; and
  b. controlling the first supply means and the second supply means such that the first skin laminate and the second skin laminate are each introduced into the pinch at a chosen tensile stress such that the skin laminates of the resulting foil laminate leaving the pinch are each adhered to the carrier foil and have differing tensions and such that in a free state the resulting foil laminate has a radius of curvature.

2. The method as claimed in claim 1, wherein the differing tensile stresses are equal and the resulting foil laminate is flat in the free state.

3. The method as claimed in claim 1, wherein the first skin laminate has an adhesion repelling layer on a side opposite the side having the glue layer, and the second skin laminate has a second glue layer on a side opposite the side having the glue layer.

4. The method as claimed in claim 1, wherein the second skin laminate has a second glue layer on a side opposite the side having the glue layer.

5. The method as claimed in claim 4, wherein at least an outer surface of the second glue layer is at least partially pressure-sensitive.

6. The method as claimed in claim 1, wherein the carrier foil is aluminum having a thickness of between 5 and 25 $\mu$m.

7. The method as claimed in claim 1, wherein the the first skin laminate and the second skin laminate each include a tensively strong layer.

8. The method as claimed in claim 7, wherein the tensively strong layer has a thickness of between 25 and 250 $\mu$m.

9. The method as claimed in claim 3, wherein the adhesion repelling layer includes a material selected from the group consisting of PTFE and a film of silicone material.

10. The method as claimed in claim 3, wherein the second glue layer is a pressure-sensitive glue layer.

11. The method as claimed in claim 4, wherein the second glue layer is a thermally-activated glue layer.

12. The method as claimed in claim 7, wherein the tensively strong layer includes a material selected from the group consisting of PET and polyester.

13. The method as claimed in claim 3, wherein at least an outer surface of the second glue layer is at least partially pressure-sensitive.

14. The method as claimed in claim 3, wherein the second glue layer is thermally-activated.

15. A method for manufacturing a foil laminate having a defined curvature, the method comprising the steps of:

a. providing an encapsulating device comprising:

a transporting means for carrying a carrier foil through the device, the carrier foil having a first surface and a second surface;

a first supply means for supplying a first skin laminate to the first surface of the carrier foil, the first skin laminate having on a first side thereof a glue layer and having on a second side thereof an adhesion repelling layer;

a second supply means for supplying a second skin laminate to the second surface of the carrier foil, the second skin laminate having on a first side thereof a glue layer and having on a second side thereof a second glue layer; and pressing means having a pinch for exerting a pressure force on a stack passing through the pinch, the stack having the carrier foil positioned between the first skin laminate and the second skin laminate;

b. supplying the first skin laminate to the first surface of the carrier foil such that the glue layer on the first side of the first skin laminate contacts the first surface of the carrier foil;

c. supplying the second skin laminate to the second surface of the carrier foil such that the glue layer on the first side of the second skin laminate contacts the second surface of the carrier foil; and d. controlling the first supply means and the second supply means such that the first skin laminate and the second skin laminate are each introduced into the pinch at a chosen tensile stress such that the skin laminates of the resulting foil laminate leaving the pinch are each adhered to the carrier foil and have differing tensions and such that in a free state the resulting foil laminate has a radius of curvature.

16. The method as claimed in claim 15, wherein at least an outer surface of the second glue layer is at least partially pressure-sensitive.

17. The method as claimed in claim 15, wherein the adhesion repelling layer includes a material selected from the group consisting of PTFE and a film of silicone material.

18. The method as claimed in claim 15, wherein the second glue layer is thermally-activated.

19. The method as claimed in claim 15, wherein:

the first skin laminate and the second skin laminate are each a tensively strong layer, and the tensively strong layer includes a material selected from the group consisting of PET and polyester.

20. The method as claimed in claim 19, wherein the tensively strong layer has a thickness of between 25 and 250 $\mu$m.

* * * * *